United States Patent [19]

Belart

[11] 4,225,022
[45] Sep. 30, 1980

[54] BRAKE BOOSTER
[75] Inventor: Juan Belart, Walldorf, Fed. Rep. of Germany
[73] Assignee: ITT Industries, Inc., New York, N.Y.
[21] Appl. No.: 937,347
[22] Filed: Aug. 28, 1978
[30] Foreign Application Priority Data
 Oct. 3, 1977 [DE] Fed. Rep. of Germany ....... 2744408
[51] Int. Cl.² ............................................. B60T 13/20
[52] U.S. Cl. ..................................... 188/348; 60/549;
  60/562; 60/576; 60/579; 60/581; 188/347
[58] Field of Search ...................... 60/547 R, 548, 549,
  60/551, 562, 568, 576, 579, 581; 188/347, 348

[56] References Cited
U.S. PATENT DOCUMENTS

| | | |
|---|---|---|
| 3,683,619 | 8/1972 | Belart ...................................... 60/549 |
| 3,827,759 | 8/1974 | Belart ...................................... 60/582 |
| 3,978,669 | 9/1976 | Belart ...................................... 60/549 |
| 4,096,696 | 6/1978 | Van House ........................... 60/547 |

Primary Examiner—Abraham Hershkovitz
Attorney, Agent, or Firm—John T. O'Halloran; Alfred C. Hill

[57] ABSTRACT

A brake booster includes a booster piston adapted to be acted upon by the pressure fluid metered through a valve device and displacing a master cylinder piston. A pressure chamber is formed between the booster piston and the master cylinder piston. An additional stepped piston is provided whose larger surface is exposed to the metered pressure fluid and whose smaller surface feeds a predetermined amount of pressure fluid into the pressure chamber so that the brakes are applied after only a short brake pedal travel.

7 Claims, 1 Drawing Figure

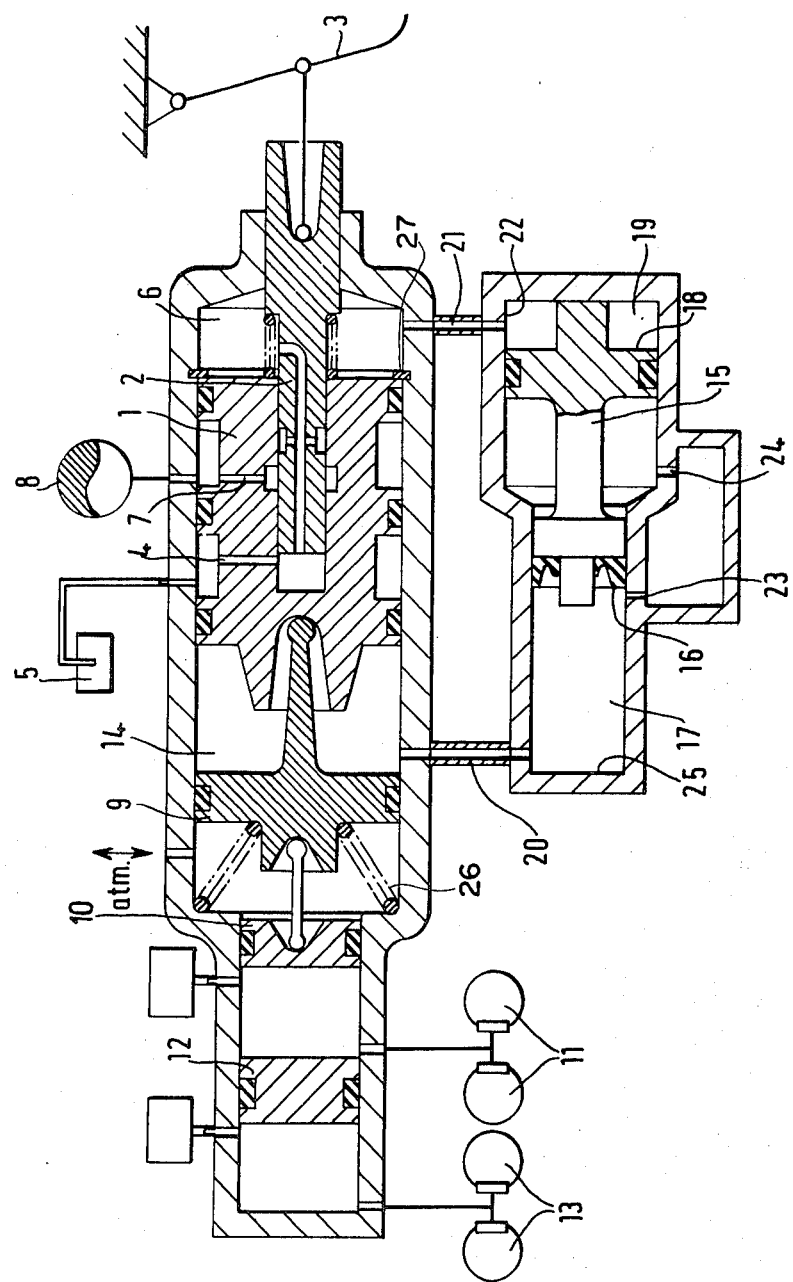

BRAKE BOOSTER

BACKGROUND OF THE INVENTION

The present invention relates to a brake booster provided with a booster piston mechanically associated with a master cylinder piston and a valve device disposed internally of the booster piston connected with a brake pedal, the valve device providing a controlled supply of pressure medium into a boosting chamber disposed between the booster piston and the brake pedal.

Such a brake booster is disclosed in British Pat. No. 1,322,156. The brake booster described in this patent has two reaction devices by means of which reaction forces act on the brake pedal. Upon the onset of the braking operation, only a hydraulic reaction device will be active which generates a reaction force via a piston and a spherical valve member controlling the supply of pressure. If the booster piston has moved by a certain amount it will abut against a rubber reaction disc by means of an outer rim, thereby, causing the rubber disc to bulge towards the brake pedal and, hence, displacing a reaction plunger which exerts a reaction force on the brake pedal via pins passed through the booster piston.

The hydraulic reaction device in the above brake booster is dimensioned such as to generate only a very small reaction force. In consequence, when the brake is operated, a certain pressure is built up in the brake system almost immediately as soon as the spherical valve member of the brake booster has opened. This so-called springing effect is desired in order to ensure that the brake shoes of the drum brakes, kept in rest position by return springs, will be brought into abutment against the brake drums at the beginning of the braking action without the driver, due to an increasing reaction force at the brake pedal, thinking wrongly that a braking force is already being exerted.

The design of the brake booster according to the above-cited British Patent is too complicated and its manufacture is, therefore, expensive. As far as its mode of operation is concerned, it is disadvantageous that a considerable brake pedal travel is needed before the brake shoes engage the brake drums. This results in a reduction of the maximum brake pedal travel available for braking.

This is no disadvantage in the event of auxiliary power operation since, due to the high pressure of the auxiliary energy, the transmission ratio can be selected so that even short displacement distances of the brake booster piston and, hence, of the brake pedal will permit the building-up of a pressure which will be high enough. However, in case the auxiliary energy fails the brake pressure must be entirely generated by the force of the driver's foot. A small transmission ratio, however, prevents the brake pdeal force from producing a sufficiently high braking pressure, said pedal force being considerably weaker than the auxiliary energy.

SUMMARY OF THE INVENTION

An object of the present invention is to provide a brake booster of the type mentioned above which features the springing effect desired for the feel of braking, yet, which also ensures the building-up of a sufficiently high braking pressure in the event of failure of the auxiliary energy.

A feature of the present invention is the provision of a brake booster comprising: a booster piston mechanically associated with a master cylinder piston; a valve device being disposed internally of the booster piston, the valve device being connected to a brake pedal and serving to control a supply of pressure medium into a boosting chamber disposed between the brake pedal and the booster piston; a first pressure medium chamber disposed between the booster piston and the master cylinder piston; an axially displaceable stepped piston having a larger active surface and a smaller active surface; a second pressure medium chamber in communication with the boosting chamber disposed adjacent the larger active surface; and a third pressure medium chamber in communication with the first pressure medium chamber disposed adjacent the smaller active surface.

The advantages of the present invention are that, upon the onset of the brake actuation, the booster piston is not displaced and only the stepped piston supplies pressure medium into the brake system. Consequently, the brake pedal has to only travel the distance which is necessary to open the valve device in the booster piston. The desired springing effect is achieved in that the pressure supplied by the valve device is transmitted by the stepped piston so that in practice the stepped piston will be filling the brake system in an abrupt manner. The booster piston will not be displaced until the stepped piston abuts against a stop. Besides the above functional advantages, the invention offers the advantage of a very easy manufacture of the described brake booster. Thus, at the same time, the high operational reliability is ensured which is required in a brake system.

One advantageous embodiment of the invention features a parallel arrangement of the stepped piston with respect to the booster piston. This embodiment allows a particularly inexpensive manufacture.

In a further embodiment of the invention the stepped piston is dimensioned so as to come to rest against a master-cylinder-side stop as soon as the brake shoes abut against a brake drum or a brake disc. Thanks to this design, during the actual braking operation, i.e. after the building-up of a braking torque, there will be no change in the transmission ratio in the brake system which would be detrimental to the feel of the driver with regard to the generated braking torque.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a schematic longitudinal cross-section of an embodiment of a brake booster in accordance with the principles of the present invention.

DESCRIPTION OF THE PREFERRED EMBODIMENT

The brake booster illustrated in the Figure comprises a booster piston 1 inside of which a valve device 2 is provided. In the described embodiment, the valve device 2 is a control slide which is mechanically coupled with a brake pedal 3. The valve device 2 is designed so as to ensure that, upon the application of the brake pedal, at first a passage 4 leading to an unpressurized reservoir 5 will be blocked in the usual manner and subsequently a boosting chamber 6 comes into communication with a pressure medium accumulator 8 via a connection 7.

The booster piston 1 is mechanically associated with a master cylinder piston 10 via an intermediary piston 9. Upon the displacement of master cylinder piston 10, pressure medium will be supplied to brakes 11 of a first brake circuit. At the same time, the displacement of the master cylinder piston 10 will bring about a displacement of a second master cylinder piston 12 which will pressurize brakes 13. Spring 26 biases intermediate piston 9 and, hence, booster piston 1 to the right as viewed in the drawing against a stop in the form of a ring 27.

Between the booster piston 1 and the intermediary piston 9, a master-cylinder-side pressure chamber 14 is formed, the importance of which will become apparent from the following description.

In parallel with the booster piston 1, a stepped piston 15 is provided, a first pressure medium chamber 17 being formed in front of its smaller active surface 16 and a second pressure medium chamber 19 being formed in front of its larger active surface 18. The first pressure medium chamber 17 communicates with the pressure chamber 14 in front of the booster piston 1 via a line 20. Via a line 21, the second pressure medium chamber 19 communicates with the boosting chamber 6.

The stepped piston 15 is arranged in a cylinder 22, in a manner similar to that of the arrangement of a master cylinder piston, with an expansion hole 23 and a compensating bore 24.

The described brake booster operates as follows: In order to actuate brakes 11 and 13 initially brake pedal 3 is moved down an amount sufficient to open valve device 2 and pressure medium will be supplied into the boosting chamber 6 through the valve device 2. The amount of pressure medium in boosting chamber 6 at this time does not provide sufficient pressure to overcome the force of spring 26. However, this pressure medium will be passed through line 21 into the second pressure medium chamber 19. This will result in a displacement of the stepped piston 15 to the left as viewed in the drawing, since the pressure resulting from the pressure medium in chamber 19 does not have any spring force to overcome. As a result, pressure medium is displaced from the first pressure medium chamber 17 into the pressure chamber 14. This will result in booster piston 1 being held in its initial position since the pressure in the pressure chamber 14 will be higher than that in the boosting chamber 6 due to the different active surfaces of the stepped piston 15. The pressure in the pressure chamber 14 will also overcome the force of spring 26 and will effect a displacement of the intermediary piston 9 which will result in a displacement of the master cylinder pistons 10 and 12 which causes the brakes 11 and 13 to be applied.

The initial brake application thus will cause the intermediary piston 9 to move away from the booster piston 1. In this way all mechanical connection between these components is cut off.

As soon as the brake shoes of the brakes 11 and 13 have been applied completely the stepped piston 15 will have come to rest against a stop 25, thus being unable to move any further. Upon a further pressure increase the booster piston 1 will be displaced, thereby, transmitting the supplied pressure to the pressure chamber 14 such as to ensure a further braking operation.

If there is a failure of the auxiliary energy in the pressure medium accumulator 8, the master cylinder piston 10 can be displaced mechanically. The stepped piston 15 will have no influence on the mechanical displaceability of the booster piston 1 and the intermediary piston 9 and, therefore, an emergency braking operation is possible without any difficulty.

While I have described above the principles of my invention in connection with specific apparatus it is to be clearly understood that this description is made only by way of example and not as a limitation to the scope of my invention as set forth in the objects thereof and in the accompanying claims.

I claim:

1. A brake booster associated with at least one brake circuit of a vehicle comprising:
    a housing including a first bore having a longitudinal axis;
    a booster piston disposed in and adjacent to one end of said first bore coaxial of said axis mechanically associated with at least a first master cylinder piston associated with said one brake circuit and disposed in said first bore adjacent the other end of said first bore coaxial of said axis, said booster piston being biased toward said one end of said first bore;
    a valve device disposed internally of said booster piston, said device being connected to a brake pedal adjacent said one end of said first bore and serving to control a supply of pressure medium into a boosting chamber disposed between said one end of said bore and said booster piston;
    a first pressure medium chamber disposed in said first bore between said booster piston and said first master cylinder piston;
    an axially displaceable stepped piston disposed in a second bore spaced from said first bore and having a larger active surface and a smaller active surface;
    a second pressure medium chamber in communication with said boosting chamber disposed in said second bore adjacent said larger active surface, said second pressure medium chamber being pressurized by said pressure medium received from said boosting chamber when said valve device supplies said pressure medium to said boosting chamber, said stepped piston being displaced to enlarge said second pressure medium chamber when said second pressure medium chamber is pressurized; and
    a third pressure medium chamber in communication with said first pressure medium chamber disposed in said second bore adjacent said smaller active surface, said third pressure medium chamber being pressurized when said stepped piston is displaced to pressurize said first pressure medium chamber to initially activate said first master cylinder piston, to hold said booster piston in its initial position and to remove the mechanical association between said booster piston and said first master cylinder piston.

2. A brake booster according to claim 1, wherein said stepped piston is dimensioned to abut against a stop disposed in said third chamber spaced from said smaller active surface as soon as brake shoes of brakes in said one brake circuit abut against a braking surface of said brakes.

3. A brake booster according to claim 1, wherein said second bore is disposed in a parallel relationship with said first bore.

4. A brake booster according to claim 3, wherein said stepped piston is dimensioned to abut against a stop disposed in said third chamber spaced from said smaller active surface as soon as brake shoes of brakes in said one brake circuit abut against a braking surface of said brakes.

5. A brake booster according to claim 1, further including
an intermediary piston disposed in said first bore coaxial of said axis between said booster piston and said first master cylinder piston to provide the mechanical association therebetween, said first pressure medium chamber being disposed between adjacent ends of said intermediary piston and said booster piston.

6. A brake booster according to claim 5, further including
a second master cylinder piston coupled to another brake circuit of a vehicle disposed in said first bore coaxial of said axis between said first master cylinder piston and said other end of said first bore, said second master cylinder piston being hydraulically actuated by said first master cylinder piston when said first master cylinder piston is actuated either hydraulically or mechanically.

7. A brake booster according to claim 1, further including
a second master cylinder piston coupled to another brake circuit of a vehicle disposed in said first bore coaxial of said axis between said first master cylinder piston and said other end of said first bore, said second master cylinder piston being hydraulically actuated by said first master cylinder piston when said first master cylinder piston is actuated either hydraulically or mechanically.

* * * * *